United States Patent Office 3,171,713
Patented Mar. 2, 1965

3,171,713
URANIUM RECOVERY PROCESSES
John Molyneux Fletcher, Harwell, Didcot, and Arthur Gregory Wain and Norman James Keen, Wantage, England, assignors to United Kingdom Atomic Energy Authority, London, England
No Drawing. Filed Apr. 21, 1961, Ser. No. 104,544
Claims priority, application Great Britain, Apr. 26, 1960, 14,666/60
4 Claims. (Cl. 23—14.5)

The invention relates to processes for the recovery of uranium and is particularly concerned with the recovery of uranium from zirconium-uranium alloys.

Zirconium alloys containing uranium, which may be enriched in U–235 content, are useful materials for nuclear reactor fuel elements. In the fabrication of such elements a certain amount of zirconium alloy is always rejected as waste and it is important to recover the valuable uranium from such waste.

Irradiated zirconium-uranium alloys also have to be chemically processed after use as fuel material in a nuclear reactor and it is important to recover uranium and plutonium efficiently from the alloys after such use.

According to the present invention, uranium is recovered from a zirconium alloy containing uranium by dissolving the alloy in a solution containing hydrofluoric acid and potassium fluoride and separating a precipitate comprising a mixed fluoride of potassium and uranium from the solution.

The alloy may be dissolved by adding it to a solution containing the hydrofluoric acid and the potassium fluoride, or by adding hydrofluoric acid to a potassium fluoride solution in contact with the alloy, but is preferably dissolved by adding a solution or solutions containing the hydrofluoric acid and the potassium fluoride to the alloy, since this leads to more consistent results.

The vessel in which the dissolving is carried out should be constructed of a material which is resistant to corrosion by hydrofluoric acid solutions, e.g., polythene, "Monel" nickel alloy, or silver.

The precipitate comprising the mixed fluoride of potassium and uranium may also contain simple uranium fluorides and also mixed potassium-zirconium fluorides; it will also contain mixed potassium-plutonium fluorides if derived from an irradiated alloy. We have found that under suitable conditions up to 99.9% of the uranium in the alloy is precipitated. The precipitate is formed concurrently with dissolution of the alloy, as soon as dissolution has begun. By choosing a suitable quantity of potassium fluoride, maximum precipitation of uranium is achieved without causing too great a precipitation of zirconium and thus a substantial separation of uranium from zirconium may be achieved without reducing the efficiency of uranium recovery.

For example, we have found that for a zirconium alloy containing 5% by weight of uranium, 1 gm.-molecule of potassium fluoride per 16 gm.-atoms of zirconium is sufficient to precipitate substantially all (99.9%) of the uranium, but that larger quantities of potassium fluoride cause the precipitation of zirconium to increase sharply. The quantity of hydrofluoric acid used should be kept to the minimum for economic reasons, to keep losses of uranium low, and to reduce the volume of waste solutions as much as possible. We have found, however, that 6 gm.-atoms of fluorine are necessary per gm.-atom of zirconium in order to achieve the maximum concentration of zirconium in the solution, i.e., the minimum volume of solution for complete dissolution of the alloy. This maximum concentration of zirconium we have found to be about 2 gm.-atoms per litre. The dissolving solution should therefore contain at least 12 gm.-atoms of fluorine per litre, and in the case of the 5% uranium alloy 0.125 gm.-atom of this per litre should be derived from potassium fluoride.

The following table shows the effect of varying the potassium fluoride content of the dissolving solution on the efficiency of uranium precipitation and the ratio of zirconium to uranium in the precipitate. The zirconium alloy consisted of 5% uranium, 1.5% tin, 0.1% iron, 0.1% nickel and 0.5% chromium, the remainder being zirconium. The dissolving solution contained a total fluorine content of 12 gm.-atoms per litre in each case, and was added to a vessel containing the zirconium alloy. The precipitate was washed with 0.01 molar potassium fluoride solution before determining the Zr/U ratio. The results are means of several experiments.

| KF concentration, molar | Percent U precipitated | Ratio Zr/U precipitate |
| --- | --- | --- |
| 0.10 | 99.84 | 0.60 |
| 0.125 | 99.93 | 0.73 |
| 0.18 | 99.94 | 1.3 |
| 0.25 | 99.95 | 2.9 |

For zirconium alloys containing less than 5% by weight of uranium, smaller amounts of potassium fluoride will be necessary to achieve precipitation of substantially all of the uranium, but as the uranium content is reduced the ratio of zirconium to uranium in the precipitate will rise, and a lower practical limit to the uranium content will be reached at 1% uranium by weight.

For zirconium alloys containing more than 5% by weight of uranium, larger amounts of potassium fluoride will be necessary to achieve precipitation of substantially all of the uranium, and the ratio of zirconium to uranium in the precipitate will decrease. A practical upper limit to the uranium content of about 50% by weight is set, however, by the large volume of precipitate formed.

In the case of uranium-zirconium alloys which have been irradiated in a nuclear reactor, the plutonium formed therein will be precipitated entirely with the uranium, while the fission products are distributed between the precipitate and the solution. It has been found that most of the niobium and caesium, and 13% of the ruthenium are precipitated with the uranium, while the remainder of these and substantially all of the strontium and rare earths remain in the solution.

The following examples illustrate the nature of the invention and the manner in which it is to be performed.

Example I

Small pieces (25 gms.) of an alloy of zirconium containing 5% uranium and also 1.5% tin, and 0.1% iron, 0.1% nickel and 0.5% chromium were placed in a polythene vessel fitted with a polythene reflux condenser. A mixture of 40% hydrofluoric acid and aqueous potassium fluoride, amounting to 130 ml. and containing 0.125 gm.-mole of potassium fluoride per litre and a total fluoride content of 12 gm. ions per litre, was added slowly until all of the alloy had dissolved, with the simultaneous formation of a precipitate. The temperature was not allowed to exceed 80° C., by controlling the rate of addition of the dissolving solution and by cooling the vessel with a water jacket. The contents of the vessel were allowed to cool to room temperature and the precipitate was then filtered off and washed with 12.5 ml. of 0.01 molar aqueous potassium fluoride. The precipitate was found to contain 99.95% of the uranium originally present in the alloy and the ratio of zirconium to uranium in the precipitate was only 0.62.

Example II

Small pieces (250 gms.) of a similar alloy to that used in Example I were placed in a "Monel" nickel alloy vessel fitted with a "Monel" reflux condenser. A mixture of 40% hydrofluoric acid and aqueous potassium fluoride, amounting to 1300 ml. and containing 0.125 gm.-mole potassium fluoride per litre and a total fluoride content of 12 gm.-ions/litre was added in Example I. The contents of the vessel were then treated as in Example I using 125 ml. of 0.01 molar potassium fluoride solution for washing the precipitate. The precipitate was found to contain 99.85% (12.48 gms.) of the uranium originally present in the alloy and the ratio of zirconium to uranium in the precipitate was only 0.7.

The precipitate was also found to contain only 13% (0.5 gm.) of the tin originally present in the alloy, and only 70 mg. and 120 mg., respectively, of copper and nickel. The combined supernatant liquid and washing liquid contained only 0.15% (20 mg.) of the uranium, 87% (3.25 gm.) of the tin, and only 40 mg. and 310 mg. of copper and nickel, respectively. The original alloy contained 250 mg. of nickel; therefore corrosion of the nickel alloy vessel has only given rise to 110 mg. of copper and 180 mg. of nickel, and only a minor proportion of each were found in the precipitate.

Example III

Small pieces (24 gm.) of a similar alloy to that used in Example I, and also small pieces (1 gm.) of a similar alloy which has been irradiated in a nuclear reactor in a slow neutron flux of $10^{12}$ neutrons/cm.$^2$/sec. for 3 days, and then cooled for 7 days out of the reactor, were treated exactly as in Example I. The precipitate was found to contain 99.86% (1.248 g.) of the original uranium and the ratio of zirconium to uranium in the precipitate was only 0.7.

The precipitate was also found to contain:

95.5% of the niobium-95 isotope,
0.2% of the strontium-89 isotope,
95% of the caesium-137 isotope,
13% of the ruthenium-103 isotope,
And less than 0.1% of the rare earth isotopes in the irradiated alloy The combined supernatant liquid and washing liquid contained the remainder of these isotopes. A substantial decontamination of the uranium from fission product strontium, ruthenium and rare earths is therefore achieved by the process of the invention.

The precipitate comprising mixed fluorides of potassium, uranium and zirconium may be subsequently dissolved in a mixture of nitric acid and aluminium nitrate to which an oxidizing agent such as potassium dichromate may be added if necessary. For instance, the precipitates obtained from the above examples were completely dissolved in a solution comprising 0.3 molar aluminium nitrate, 0.1 molar nitric acid and 0.03 molar potassium dichromate, sufficient volume of dissolving solution being used to obtain a solution containing about 1 gm.-atom per litre of fluorine. At higher concentrations of fluorine, the solution was not stable and precipitates were formed on standing.

The uranium may then be recovered from the solution by solvent extraction.

We claim:

1. A process for recovering uranium from a zirconium alloy containing from 1 to 50% by weight of uranium, comprising the steps of dissolving the alloy in an aqueous solution containing hydrofluoric acid and potassium fluoride and having a total initial fluorine content of at least 12 gm.-atoms of fluorine per liter and separating a precipitate comprising a mixed fluoride of potassium and uranium from the solution.

2. A process according to claim 1, in which the alloy contains 5% uranium and the solution initially contains 0.125 mole of potassium fluoride per litre.

3. A process according to claim 2, in which the alloy contains 5% uranium, 1.5% tin, 0.1% iron, 0.1% nickel and 0.5% chromium.

4. A process according to claim 1, in which at least part of the alloy has been irradiated in a nuclear reactor.

References Cited in the file of this patent

UNITED STATES PATENTS

| | | |
|---|---|---|
| 2,717,234 | Nagy | Sept. 6, 1955 |
| 2,820,692 | Shor et al. | Jan. 21, 1958 |
| 2,947,601 | Seaborg | Aug. 2, 1960 |
| 3,000,695 | Seaborg | Sept. 19, 1961 |
| 3,012,849 | Horn | Dec. 12, 1961 |

FOREIGN PATENTS

| | | |
|---|---|---|
| 572,182 | Canada | Mar. 10, 1959 |
| 801,380 | Great Britain | Sept. 10, 1958 |

OTHER REFERENCES

TID 7534, Symposium on the Reprocessing of Irradiated Fuels, Book 1, pp. 244–250, May 1957.